US010140591B2

(12) United States Patent
Panigrahi et al.

(10) Patent No.: US 10,140,591 B2
(45) Date of Patent: Nov. 27, 2018

(54) METHOD AND SYSTEM FOR SUPPLEMENTING JOB POSTINGS WITH SOCIAL NETWORK DATA

(71) Applicant: Oracle International Corporation, Redwood Shores, CA (US)

(72) Inventors: Namita Panigrahi, San Ramon, CA (US); Kerry Hodder, Clontarf (AU); Kathi Lynn Chenoweth, Schererville, IN (US); Ravi Shankar Banda, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 560 days.

(21) Appl. No.: 14/498,612

(22) Filed: Sep. 26, 2014

(65) Prior Publication Data

US 2016/0092837 A1 Mar. 31, 2016

(51) Int. Cl.
| G06F 17/30 | (2006.01) |
| G06Q 10/10 | (2012.01) |
| G06Q 50/00 | (2012.01) |

(52) U.S. Cl.
CPC ... *G06Q 10/1053* (2013.01); *G06F 17/30029* (2013.01); *G06F 17/30159* (2013.01); *G06F 17/30864* (2013.01); *G06F 17/30867* (2013.01); *G06Q 50/01* (2013.01)

(58) Field of Classification Search
CPC ......... G06F 17/30029; G06F 17/30864; G06F 17/30867

USPC ........................................................ 707/710
See application file for complete search history.

(56) References Cited

U.S. PATENT DOCUMENTS

| 8,078,741 | B2 | 12/2011 | Barnfield et al. |
| 8,224,851 | B2 | 7/2012 | Banda et al. |
| 8,924,382 | B2 | 12/2014 | Banda et al. |
| 9,224,130 | B2 | 12/2015 | Klaus et al. |
| 2010/0274912 | A1 | 10/2010 | Barnfield et al. |
| 2010/0293126 | A1 | 11/2010 | Lang et al. |
| 2011/0029567 | A1 | 2/2011 | Banda et al. |
| 2011/0035674 | A1 | 2/2011 | Chenoweth et al. |
| 2011/0055098 | A1* | 3/2011 | Stewart .................. G06Q 10/00 705/321 |
| 2011/0208822 | A1* | 8/2011 | Rathod ................... G06F 15/16 709/206 |
| 2012/0282576 | A1 | 11/2012 | Chenoweth et al. |
| 2013/0086089 | A1 | 4/2013 | Banda et al. |
| 2013/0132864 | A1 | 5/2013 | Panigrahi et al. |
| 2013/0178956 | A1 | 7/2013 | Vashist et al. |
| 2013/0191299 | A1* | 7/2013 | Hermsdorff ........ G06Q 10/1053 705/321 |

(Continued)

*Primary Examiner* — Mark E Hershley
(74) *Attorney, Agent, or Firm* — Vista IP Law Group, LLP

(57) ABSTRACT

The present application present systems and methods for leveraging existing sources of information to supplement and enhance job opening postings and other types of business postings. A plurality of sources, including social network sites, talent profiles, and/or surveys and questionnaires are accessed in order to retrieve data relating to a business object. The retrieved data is transformed, such that it may be used to supplement job opening postings and other types of postings with job description data, work culture data, and other business-related data in order to build a social brand for the business.

27 Claims, 15 Drawing Sheets

(56) References Cited

U.S. PATENT DOCUMENTS

| | | | |
|---|---|---|---|
| 2013/0282605 A1* | 10/2013 | Noelting | G06Q 10/1053 705/321 |
| 2014/0032659 A1* | 1/2014 | Marini | H04L 51/32 709/204 |
| 2014/0059495 A1 | 2/2014 | Klaus et al. | |
| 2014/0143004 A1* | 5/2014 | Abhyanker | G06Q 10/087 705/7.19 |
| 2014/0156681 A1* | 6/2014 | Lee | G06F 17/30867 707/754 |
| 2014/0282098 A1* | 9/2014 | McConnell | G06Q 10/0639 715/753 |
| 2014/0297550 A1* | 10/2014 | Miller | G06Q 10/1053 705/321 |
| 2015/0006414 A1* | 1/2015 | Janapareddy | G06Q 50/01 705/319 |
| 2015/0127565 A1* | 5/2015 | Chevalier | G06Q 10/00 705/319 |
| 2015/0347973 A1* | 12/2015 | Singh | G06Q 10/1053 705/321 |
| 2016/0078108 A1 | 3/2016 | Klaus et al. | |

\* cited by examiner

METHOD AND SYSTEM FOR SUPPLEMENTING JOB POSTINGS WITH SOCIAL NETWORK DATA

BACKGROUND AND SUMMARY

In many organizations, in order to find and attract candidates for a job opening in the organization, a hiring manager or recruiter will typically post an open job position on the organization's website or on a dedicated jobs website (e.g., HotJobs, LinkedIn, Yahoo Jobs, etc.), wherein the posting will contain information about the job. Job seekers are then able to view the open job postings on such websites, and identify jobs that match their interests and qualifications.

If there is insufficient information on an open job posting, a potential applicant may not be able to properly assess whether the job opening is one that he or she would like to apply to. For example, the applicant may wish to know additional information about the job before deciding whether or not to submit an application. This may include job requirements, the backgrounds and qualifications of others who hold the job, and/or insights into the work culture of the organization. However, it is often difficult or time-consuming for recruiters and hiring managers to have to create such information for job postings themselves from scratch, nor are they always the best people to provide such information. As a result, recruiters and hiring managers may miss out of potential candidates who would be a good fit for the job opening.

Given the current trends towards social collaboration and shared information, many organizations may have access to copious amounts of data relevant to particular job openings, work culture, and other information that may be considered important by a potential job seeker. Thus, it would be very useful to provide effective mechanisms for leveraging existing data (e.g., social network data and other internal assets of the organization), in order to provide additional information to job seekers regarding open job positions.

Embodiments of the present invention provide a system, method, and computer program product for allowing a business entity collate and aggregate existing data from a variety of sources, in order to enhance and supplement job opening postings and other types of business postings.

Other additional objects, features, and advantages of the invention are described in the detailed description, figures, and claims.

BRIEF DESCRIPTION OF FIGURES

The present invention is illustrated by way of example, and not by way of limitation, in the figures of the accompanying drawings and in which like reference numerals refer to similar elements and in which.

DETAILED DESCRIPTION

Figure 1:
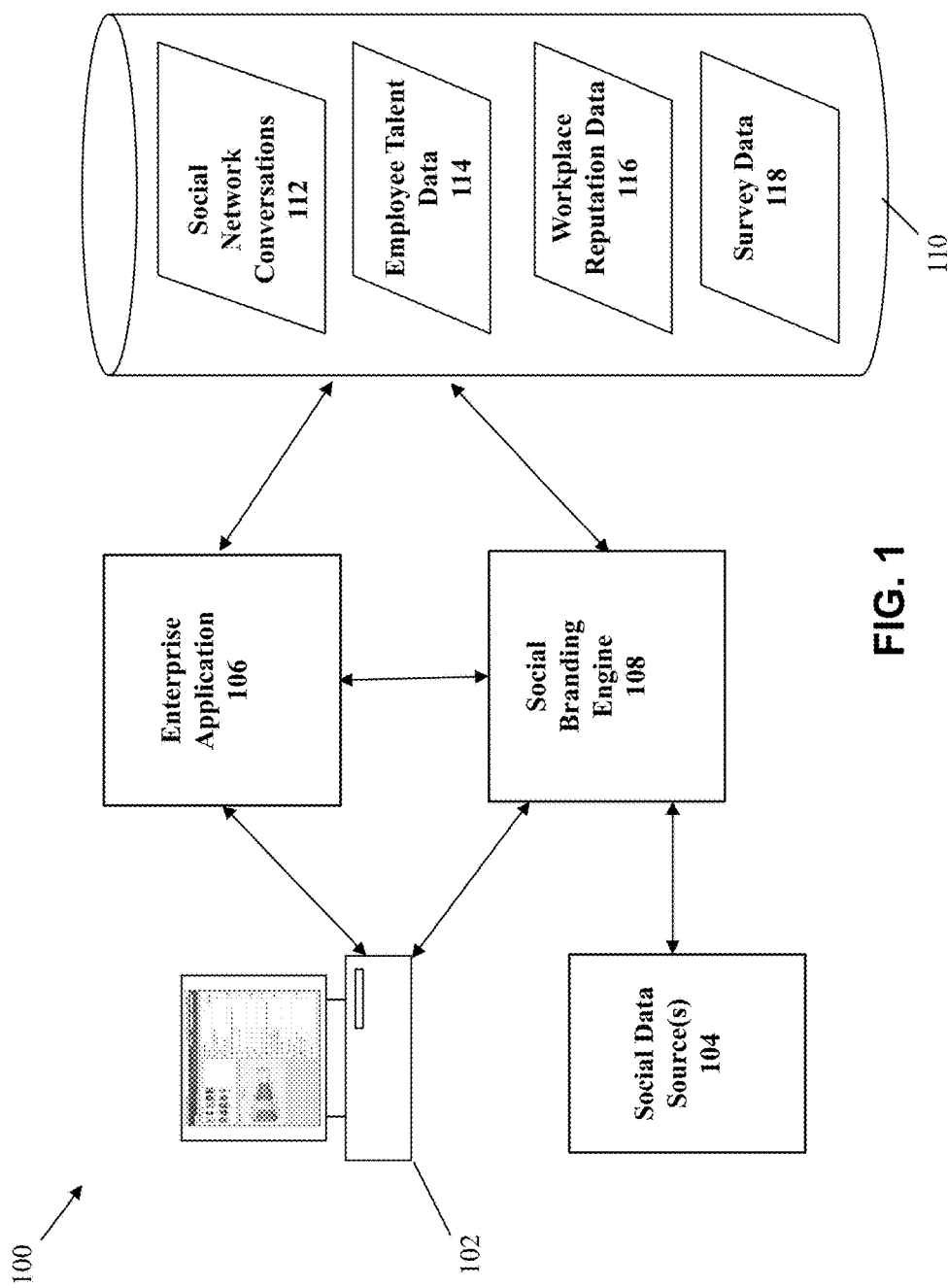
FIG. 1 illustrates an example system which may be employed in some embodiments of the invention to implement analysis and integration of social network data with enterprises and enterprise applications.

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments. In addition, for the purposes of illustration and explanation, the present disclosure is described in various embodiments in the context of enterprise applications. It is noted, however, that the invention is not limited in its scope to enterprise applications, and indeed, may be applied to other types of applications as well.

The present disclosure is directed to an approach for leveraging existing sources of information to supplement and enhance job opening postings and other types of business postings. The invention is capable of collecting data from a plurality of sources, including social network sites, talent profiles, and/or surveys and questionnaires. The retrieved data may be transformed (e.g., aggregated and/or summated), such that it may be used to supplement job opening postings and other types of postings with job description data, work culture data, and other business-related data in order to build a social brand for the business.

FIG. 1 illustrates an example system 100 which may be employed in some embodiments of the invention to identify, retrieve, aggregate and summate social network data for social branding purposes. The system 100 includes one or more users at one or more user stations 102 that use the system 100 to operate the enterprise application 106 and/or the social branding engine 108. The user station 102 comprises any type of computing station that may be used to operate or interface with the applications 106/108 in the system 100. Examples of such user stations include, for example, workstations, personal computers, or remote computing terminals. In some embodiments, user station 102 may be a portable device, such as a tablet or smartphone. The user station 102 may comprise a display device, such as a display monitor, for displaying a user interface to users at the user station. The user station 102 may also comprise one or more input devices for the user to provide operational control over the activities of the system 100, such as a mouse, keyboard, touchscreen, or joystick, to manipulate a pointing object in a graphical user interface to generate user inputs to the enterprise application and/or social networking application.

According to some embodiments, integration is provided between an enterprise application 106 and a social branding engine 108. The enterprise application 106 comprises any business-related application that provides visibility and control over various aspects of a business. Such enterprise/ business applications can include, without limitation, customer relations management ("CRM") applications, enterprise resource planning ("ERP") applications, supply chain management applications, and other applications dealing with various finance, accounting, manufacturing, human resources, and/or distribution functions, to name but a few examples. Exemplary enterprise application suites include, without limitation, Oracle Fusion, Oracle eBusiness Suite, JD Edwards Enterprise One, Oracle Cloud, PeopleSoft, and Siebel all of which are available from Oracle Corporation of Redwood Shores, Calif.

The social branding engine 108 provides a framework for receiving and aggregating data from various sources relevant to a business object in order to build a social brand of the organization, such as by supplementing job postings with additional information pertinent to the job position and the organization. For purposes of the present specification, a business object (hereinafter also referred to as a BO) may refer to a person, a job opening, work group or other type of organizational unit, or any other business-related group or entity.

The social branding application 108 may receive or extract data from one or more online social data sources 104 stored on one or more different computing systems. Social data sources 104 may include, for example, a social network site (e.g., an organization's internal social network), a profile management system, a talent management system, and/or results from questionnaires and surveys. The content received or extracted by social branding application 108 from social data sources 104 may include one or more comments or conversations (e.g., one or more posts on a social network), profile information, talent information, survey responses, or uploaded postings (e.g., images and associated metadata, text, rich media, URLs) at the one or more sources. The social data/content may therefore comprise a variety of forms and/or types.

The data retrieved or extracted from social data sources 104 (e.g., social network conversation data 112, employee talent data 114, workplace reputation data 116, and survey data 118) can be stored into a database in a computer readable storage device 110. The computer readable storage device 110 comprises any combination of hardware and software that allows for ready access to the data that is located at the computer readable storage device. For example, the computer readable storage device 110 could be implemented as computer memory operatively managed by an operating system. The computer readable storage device 110 could also be implemented as an electronic database system having storage on persistent and/or non-persistent storage.

Social branding engine 108 may be used to perform a variety of actions to retrieve data from social data sources 104 to be stored in storage device 110. For example, semantic filtering and analysis may be performed upon the social data sources 104 to extract social network conversations 112 or other types of social network data. Based upon this analysis, rich-content tags may be associated with the content to identify social network conversations 112 associated with particular business objects. Social branding engine 108 may also be used to retrieve or identify employee talent data 114, workplace reputation data 116, and/or survey data 118 associated with particular business objects of interest. A user, such as a hiring manager or HR personnel, may then view and perform actions on the retrieved data. In some embodiments, automated actions may also be performed on the retrieved data. In addition, in some embodiments, tagged social network content and candidates can be dispatched to the enterprise application(s) based at least in part upon the tags, for performing further business processing.

Figure 2:
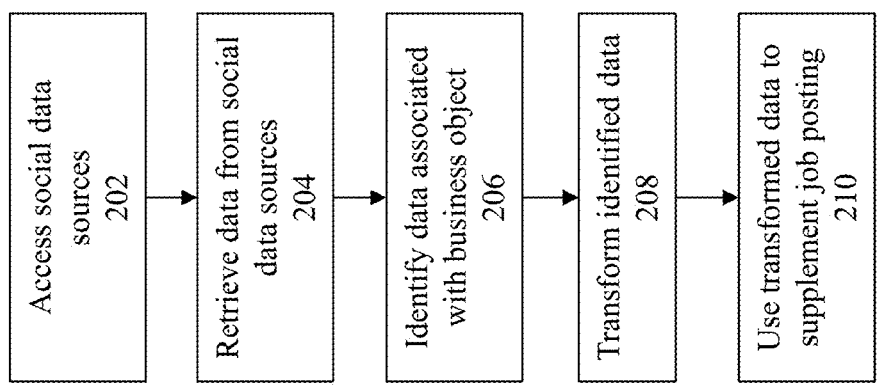
FIG. 2 illustrates a flowchart of a process for performing social branding in accordance with some embodiments.

FIG. 2 illustrates a flowchart of a process for performing social branding in accordance with some embodiments, wherein a user is able to leverage existing social information in order to establish a social brand for a business object, such as by supplementing a job posting for a particular job position. At 202, the system accesses a plurality of social data sources, wherein the social data sources are associated with a plurality of users. As described above, these may include a social network site, a profile management system, a talent management system, and/or results from questionnaires and surveys.

At 204, data generated by users of the plurality of social data sources is retrieved. The data may include social network conversations, social network profile data, talent profile data, and/or survey and questionnaire data. At 206, the retrieved data is filtered and analyzed in order to identify data associated with a particular business object, such as a job position. In some embodiments, this may be done through semantic filtering, vector analysis, or identifying one or more tags or labels associated with the data. In some embodiments, the identified data associated with the business object is tagged or categorized, and stored for later use.

At 208, a transformation is performed on the identified data, so that it can be used to supplement a job posting or perform some other type of social branding function associated with the business object. In some embodiments, the transformation comprises identifying and selecting one or more excerpts or portions of the data to be used for social branding. For example, excerpts of a social network conversation or of answers to a questionnaire may be selected and formatted for supplementing a job opening posting. In other embodiments, transforming the data comprises performing an aggregation on the data. For example, profile characteristics of individuals holding a particular job position may be aggregated to form an overall profile for the job position, which can then be used to supplement a job posting for the job position. Survey responses to a questionnaire may be aggregated and analyzed to identify an average response or a most common response. At 210, the transformed data is used to perform social branding (e.g., supplement the job posting or other posting).

Figure 3:
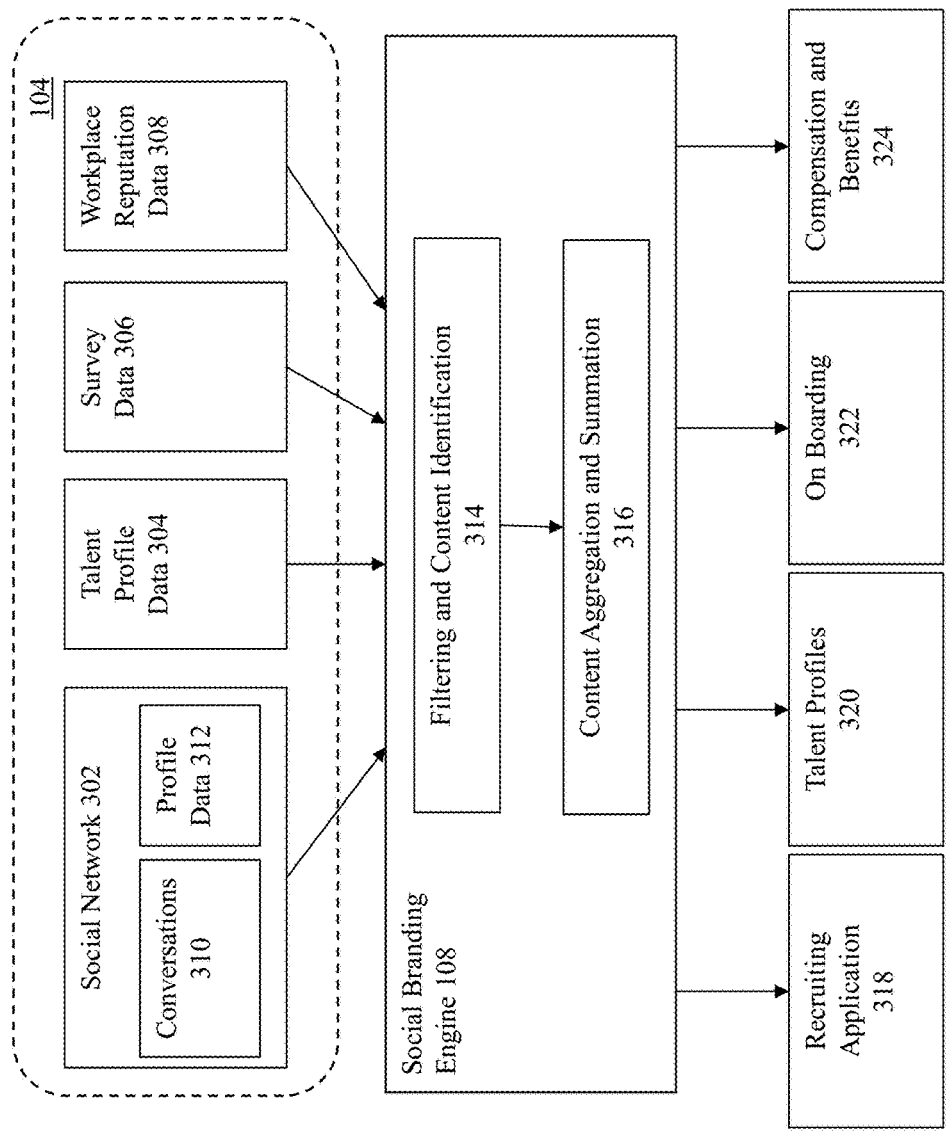
FIG. 3 illustrates an architecture for implementing a social network recruiting application for identifying and assess candidates in accordance with some embodiments.

FIG. 3 illustrates a social branding engine 108 in accordance with some embodiments and the types of social network data that it may be able to receive and analyze.

Social branding engine 108 receives data from a plurality of social network sources 104. These may include but are not limited to a social network 302, talent profile data 304, survey data 306, and/or workforce reputation data 308.

In some embodiments, a social network 302 may be a public social network site (e.g., Facebook, Twitter, etc.), or an organization's own internal social network (e.g., Oracle Social Network). Social network 302 may provide a framework for which users (e.g., employees of the organization) may create and engage in conversations 310. These conversations may be associated with various businesses objects, such as a job opening, a work project, or other work-related topics. Users (employees) who collaborate on a business object may document their discussion using conversations 310.

Social network 302 may contain profiles 312 corresponding to the users of social network 302, which in some embodiments may be shared with other users of the social network 302, based upon one or more sharing permissions (e.g., an employee's profile may be shared with other employees in their workgroup, with other employees in the organization, or with the public). Profiles 312 may be used to maintain data related to social activities of their associated users. For example, a profile of a particular user associated with a business object (e.g., an employee holding a particular job position, or associated with a workgroup having an available job opening) may track the social activity of the user, allowing for conversations participated in by the user to be identified and retrieved for analysis.

Figure 10A:
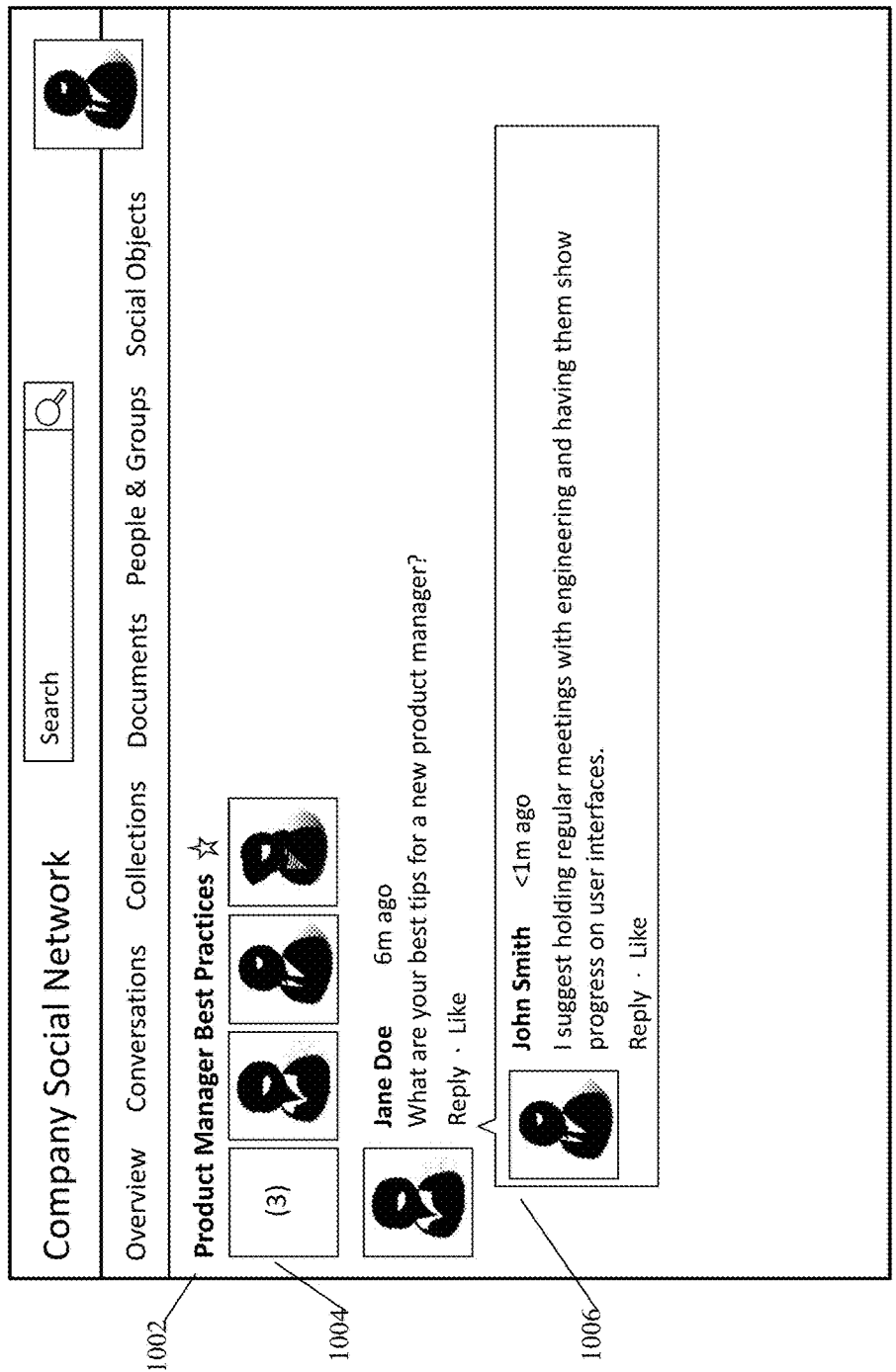
FIGS. 10A-10E illustrate example screenshots of conversation, profile, and talent information that may be used to perform social branding in accordance with some embodiments.

FIG. 10A illustrates an example conversation 310 that that may be found in a social network 302 in accordance with some embodiments. A conversation 310 may have a title specifying a subject of the conversation displayed in a display area 1002. In some embodiments, users are that are participants of the conversation may be displayed at display area 1004. For example, in the illustrated embodiment, display area 1004 indicates that three users are participants of the displayed conversation. In some embodiments, display area 1004 may only show the number of users participating in the conversation, while in other embodiments the actual users are listed or displayed. In some embodiments, the users may comprise all users that have actually participated in the conversation, while in other embodiments, the users may comprise all users that have been invited to participate in the conversation (e.g., by a conversation creator, administrator, or other user), even if they have not yet actually participated in the conversation.

The users participating in the conversation may make posts 1006 in the conversation. In some embodiments, the posts may be "top-level" posts, or be replies to other posts in the conversation (e.g., in the illustrated conversation, the post by John Smith is a reply to the top-level post by Jane Doe). The posts may be text-only, or may include attached media, such as pictures or video.

Figure 10B:
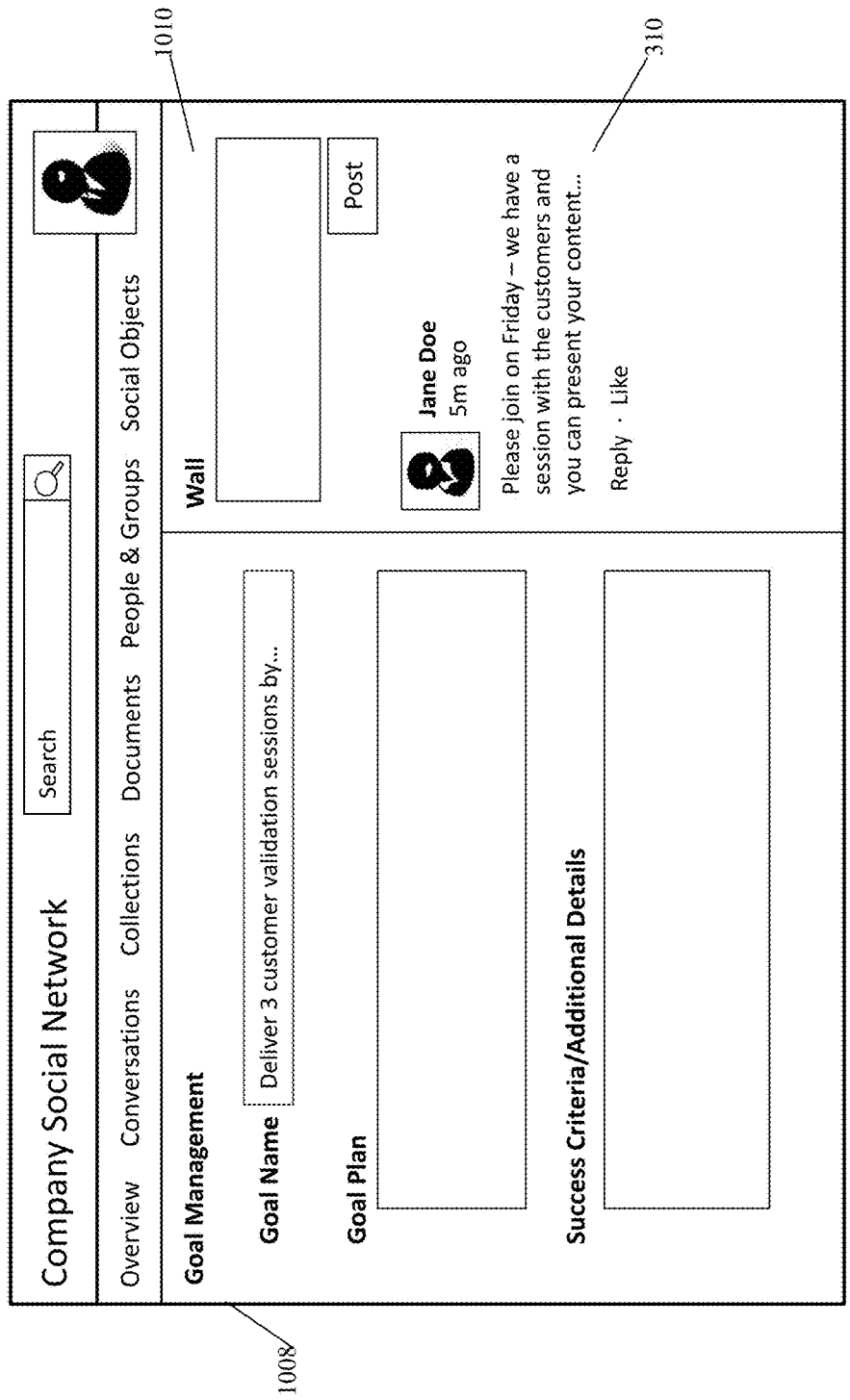

FIG. 10B illustrates another social network conversation 310 in accordance with some embodiments made to be associated with a particular business object. For example, as illustrated in the figure, a business object (e.g., a performance goal) is shown in display area 1008. The business object may have a wall 1010 or other type interface that can be used to create a conversation 310 related to the business object.

Figure 10C:
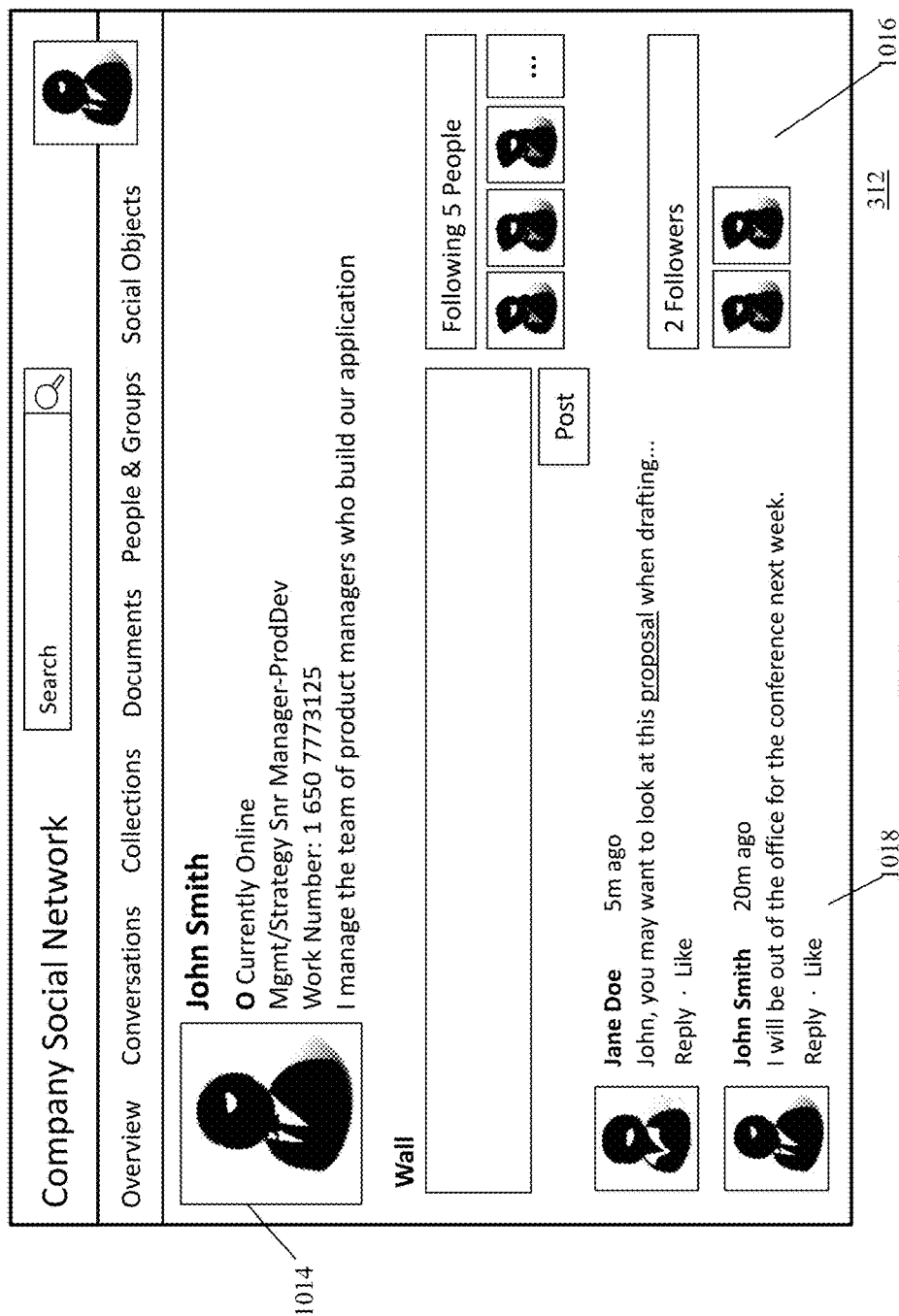

FIG. 10C illustrates an example profile 312 that may be found in a social network 302 in accordance with some embodiments. Profile 312 may contain a plurality of display regions containing different data regarding the user. For example, the name, job position, and other user information may be displayed at display area 1014, while social network connections of the user (e.g., friends, followers) may be displayed at display area 1016. In some embodiments, a display area 1018 may provide a wall or other type of interface allowing other social network users to send messages or add content to the user's social network profile. In some embodiments, these messages and posts may also be considered conversations that can be retrieved and analyzed by the social branding engine.

In some embodiments, an organization may have a profile management system for managing employee talent profile data 304. For example, talent profiles containing talent profile data 304 for the employee (e.g., the employee's education, skills, certifications, career achievements, etc.) may be maintained for individual employees. These profiles may be maintained by the employees themselves, or by a manager or other personnel. In some embodiments, the employee talent profiles may be located as part of the employee social network profiles or as subpages of the employee social network profiles, while in other embodiments, employee talent profiles are stored separately.

In addition, profile management system may also contain talent profile data 304 for particular jobs or other types of business objects. In some embodiments, a profile for a particular job may contain information manually entered by a hiring manager, director, or other personnel, while in some embodiments, the profile may be constructed through an automated process based upon the profiles of employees holding the particular position. For example, data from the individual employee profiles may be aggregated to obtain a position profile showing aggregate talent attributes of employees who hold or have held the position (e.g., average education level, most common skills, etc.).

Figure 10D:
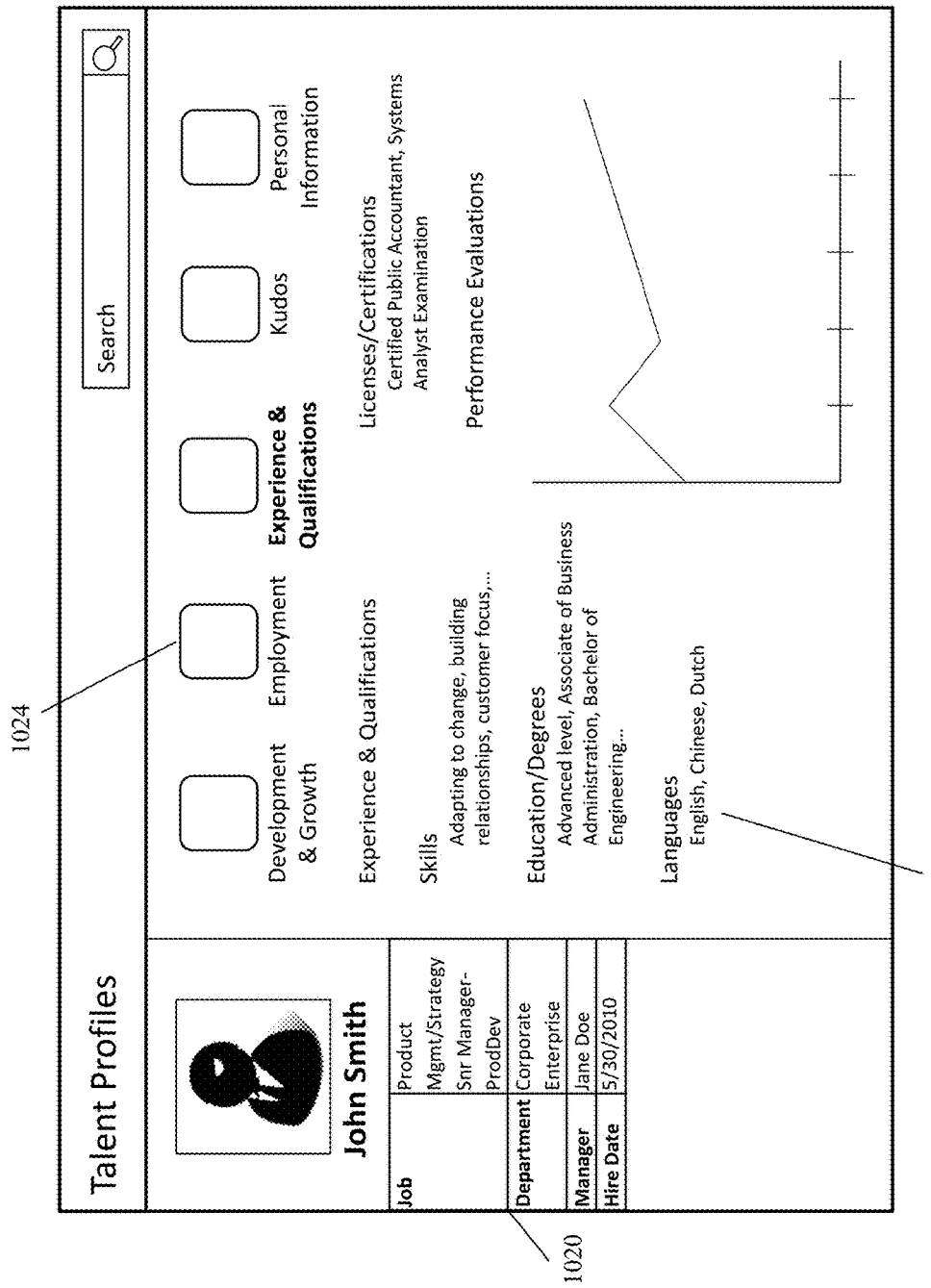
Figure 10E:

FIGS. 10D and 10E illustrate an employee talent profile in accordance with some embodiments. The employee talent profile may contain various talent related information, such as the employee's position and group assignments 1020, and the employee's skills, experience, and qualifications 1022. The employee talent profile may also contain past performance evaluations, areas of expertise, work requirements, and employee's goal attainment history, milestones, and other development metrics. The employee talent profile information may be spread over a plurality of categories or subpages 1024. In some embodiments, the employee talent profile may contain one or more graphs or tables for comparing an employee's skills or attributes to a target or minimum or average skill/attribute values associated with the job position (e.g., at 1026). The minimum or average skill/attribute values may have been manually entered by a hiring manager, director, or other personnel, or automatically retrieved from a talent profile for the job position the user is associated with.

In some embodiments, the organization may send surveys or questionnaires to its employees pertaining to any work-related topic (e.g., company culture, job satisfaction, specific company events, etc.). The received responses may be stored as survey or questionnaire data 306.

In some embodiments, the organization may also maintain a workplace reputation module containing workplace reputation data 308. The workplace reputation data 308 may comprise scores or evaluations of employees in the organization, such as yearly or quarterly employee evaluations, and may include qualitative and/or quantitative evaluations. In some embodiments, workplace reputation data 308 may also comprise social network reputation (e.g., amount of "kudos" or "likes" received by a user for their social network activities).

Social branding engine 108 retrieves data from these different types of sources 104. Once retrieved, a filtering and content identification module 314 is used to filter the retrieved content and identify relevant data. The identified filtered content may then be aggregated and organized using an aggregation and summation module 316. These processes for different types of sources will be described in further detail below.

The aggregated data gathered and organized by social branding engine 108 may then be integrated with various other modules. These may include a recruiting application 318, talent profiles 320, on boarding module 322, and/or compensation and benefits data 324. For example, the data aggregated by social branding engine 108 may be used to supplement job information in an open job posting using recruiting application 318. The data may also be used to form a talent profile for particular job positions using talent profile 320. In some embodiments, the data may be used by on boarding module 322 to provide information and resources for guiding, connecting, and developing new hires in order to get them up to speed. In addition, the data may include employee info and job info used to analyze and assess employee compensation and benefits 324. It is understood that the above modules are given for the purpose of example, and that in other embodiments, various other modules or combinations of modules may be implemented that make use of the aggregated data.

Social Network Sources

Figure 4:
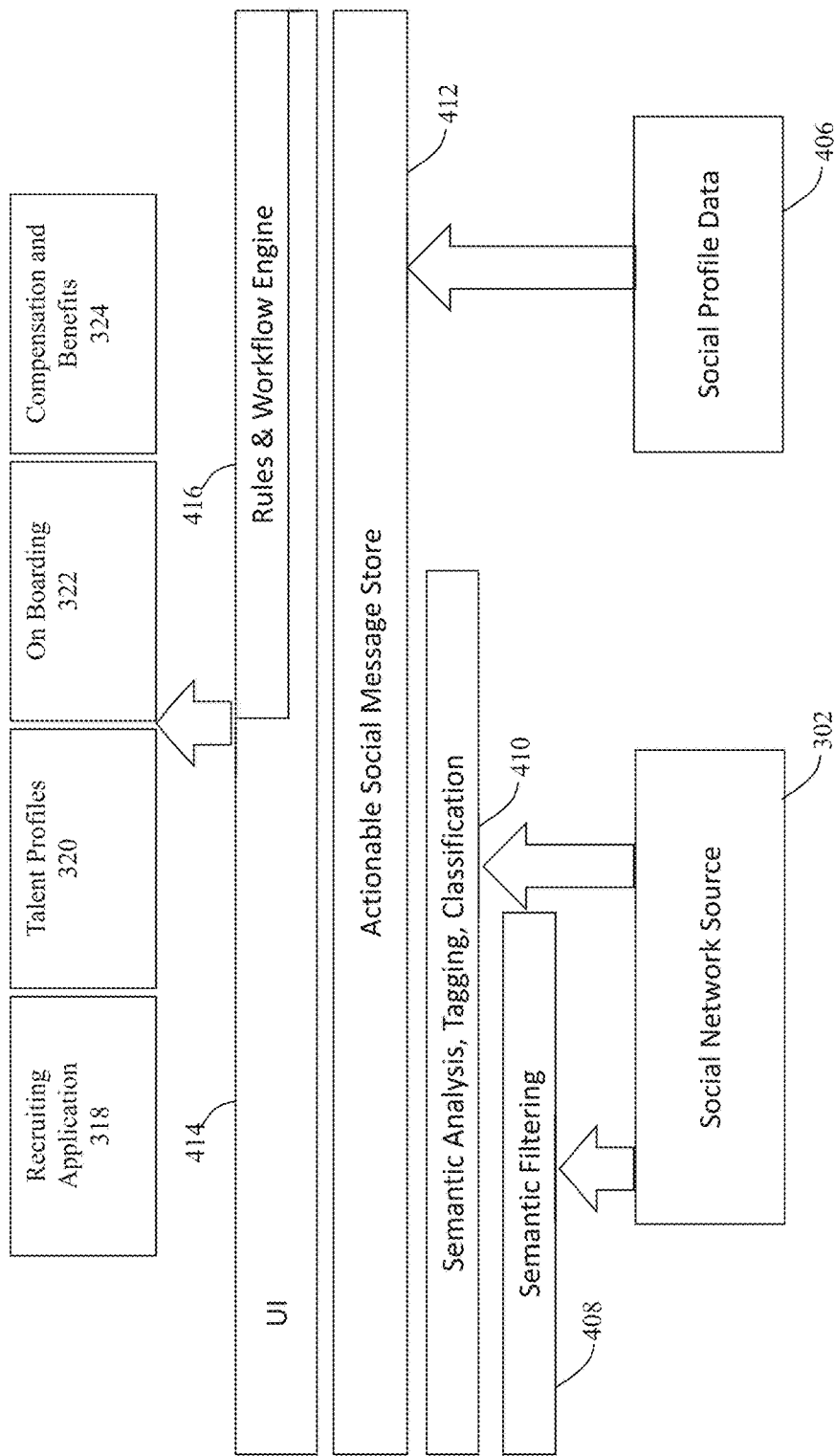
FIG. 4 illustrates an architecture for semantically filtering and analyzing social network data in accordance with some embodiments.

FIG. 4 shows an architecture for implementing filtering and identification in accordance with some embodiments of the invention. Data from one or more social network sources 302 are received into the system. The social data may be from either public social network sources or private social network sources. Public social network data/messages include, for example, publically available content from public blog sites, twitter messages, RSS data, and social network sites such as Facebook. Private social network data/messages include, for example, content from internal company social networking sites. In some embodiments, the data that is received for processing may include non-social data. Such data includes, for example, enterprise data from non-public sources, such as, email, chats, transcribed phone conversations, transcribed videos.

Semantic analysis is performed upon the received data. For example, latent semantic analysis (LSA), an advanced form of statistical language modeling, can be used to perform semantic analysis upon the social data. This permits the system to understand the contextual and semantic significance of terms that appear within the social data. This type of analysis can be used, for example, to understand the difference between the term "Galaxy" used in an astronomy context, "Galaxy" the name of a professional soccer team, and "Galaxy" the name of a line of mobile devices.

Semantic filtering 408 is a mechanism that is provided to minimize miss-categorizations of the social data. Much of the social data is likely to contain content which is of very little interest to a business organization. Semantic filtering is used to remove the irrelevant material from the social data to reduce the occurrence of false positives, false negatives, and inappropriate responses/rejections within the actionable data. This permits the resulting data to be more relevant and accurate when provided to the enterprise applications.

In some embodiments, all social data content is subject to semantic filtering to reduce the excess "noise" of irrelevant data. In an alternate embodiment, only public social network content undergoes semantic filtering, such that the private social network content (e.g., content from the organization's internal social network) is not subject to the semantic filtering, due to an assumption that the public social network content is more likely to contain data of little interest to the enterprise. In yet another embodiment, both the public and private social network data are subject to semantic filtering, but the filtering is handled differently so that greater levels/intensity of filtering is imposed on the public data as opposed to the private data.

The system performs semantic analysis and classification 410 to the social network data. This permits the system to create and apply filters to identify themes, and to cluster together like-minded messages, topics, conversations, and content. There are numerous ways that can be taken to semantically categorize the social network content. The categorizations and classifications can be performed with an eye towards identifying, for example, conversations pertaining to particular business objects, such as a particular job position, or an event related to the work culture of the organization.

Based upon the semantic analysis and classification, tags are identified and associated with the social network content. The tags correspond to areas of analytical importance with respect to the organization that will be consuming the results of the system. For example, a business may seek to use the system to analyze social network data to tag and identify postings and conversations pertaining to certain business objects (e.g., a particular open job position, a particular workgroup, etc.). The categorized and tagged social network data may be stored as an actionable social message store 412, from which the data may be aggregated, summarized, and acted upon.

In some embodiments, social profile data 406 may also be accessed and associated with the originator of specific items of social network content. Social profile data 406 may include, for example, information about the social "importance" of that person, e.g., using Klout data and/or follower count. The social profile data 406 may also include demographic information about the person, including information about the person's income, age, profession, and geographic location. This profile data is useful for many purposes. For example, in some embodiments, conversations or postings associated with a person having a high Klout score and/or a high number of followers may be given additional weight. In some embodiments, social profile data 406 is retrieved from profile data 312 from social network source 302.

When analyzing internal social data, social profile data 406 may comprise employee data that may be used as part of the analysis for the internal social network content (e.g., from talent profile data 304 or workforce reputation data 308). When the person is an employee there is additional profile information that may exist for the individual (e.g., organization information—who is the manager/employee, job function, job level, peer group, location, etc.). As noted above, external influence may be analyzed, e.g., using a Klout score. Similarly, internal influence can similarly be analyzed, tracked, and/or leveraged using various data points, e.g., based at least in part on job role, responsibility, title, number of employees managed by person, and/or number of individuals in that person's organizational hierarchy. For example, social network data pertaining to a particular business object may be given more weight if the user from which the data originated from is associated with the business object, in comparison to a user who is not associated with the business object. Depending on the employee's talent profile and/or workforce reputation, the employee's contributions to an identified social network conversation may be given more or less weight.

The workforce reputation of an employee may be calculated from a number of different scores. These may include level of engagement (e.g., measuring the amount of social network activity that the employee has participated in), influence (e.g., level of endorsement, recommendation from other users), generosity (e.g., amount of kudos, recommendations, likes that the employee gives to other social network users), or any other relevant metric. For example, content associated with an employee who gives and receives positive feedback to and from other users may be given additional weight compared to an employee with less social network activity.

The data within the actionable social message store 412 can be processed using any suitable processing mechanism. In one embodiment, manual processing is performed using a user interface (UI) 414, whereby a user reviews the actionable social network data and manually takes action to direct the data to an appropriate destination (e.g., directing messages associated with a "product manager" position to appropriate personnel involved in the hiring of product managers). In an alternate embodiment, automated processing is performed using a rules and workflow engine 416. In this approach, a set of rules is provided in a rulebase, where the rules identify how the data should be handled and directed within the organization. The rulebase can be constructed as a learning system, where feedback and a neural network algorithm are used to improve the handling of data based upon looking at the results from past handling of messages. Once data has been directed to an appropriate destination, it may then be transformed (e.g., aggregated and/or summated) in order to be used for social branding purposes.

The system then dispatches and/or creates the appropriate data to be sent to destinations within the enterprise. The data to these vertical applications are dispatched based at least in part upon the tags that are associated with the data in the actionable social message store. When the other system takes action upon receiving the data, then in some embodiments an update is provided in the actionable social message store with the update status of the message.

In some embodiments, semantic filters are used to identify relevant social network data in accordance with some embodiments, by filtering social network messages and conversations for keywords or phrases that indicate a relevance to a business object. The filter may be based upon specific keywords, strings, and/or combinations of words located within a certain proximity. In some embodiments, a combination of filters can be used to categorize a particular conversation, posting, or other piece of social network content. The combination of filters may comprise one or more necessary filters, and one or more filter groups, wherein only a certain number of filters in the group need to be satisfied. For example, a "work culture" tag may be applied to a conversation if the conversation satisfies at least one of a "summer volunteer event" filter or a "Friday social" filter, or other filters pertaining to specific work culture related events. In some embodiments, the filters may be applied to the entire social network conversation, while in other embodiments, the filters may be applied only to conversation titles or a subset of the posts in the conversation.

In some embodiments, in addition or in the alternative to tagging content using filters, a vector based approach may be used. For example, each tag or topic may be associated with one or more semantic vectors (e.g., a "product manager" tag is associated with a particular vector). When social network data is received, the data may be converted into one or more semantic vectors through semantic analysis. The semantic vectors associated with the social network data is then compared to the semantic vectors associated with the tags. If a match of sufficient strength is found, the social network data is associated with the tag.

In some embodiments, a social network conversation may be identified by one or more pre-configured tags or labels associated with the conversation. For example, a user starting a conversation may be given an option to tag or label the conversation based upon an intended topic (e.g., "product manager," "summer volunteer event," "work culture," etc.). This may allow the social branding application to quickly and easily identify conversations pertaining to certain topics, without having to use semantic or vector analysis. In some embodiments, conversation participants may also be able to set one or more tags for the conversation. In some embodiments, if a conversation is created to be associated with a particular business object (e.g., as illustrated in FIG. 10B), then that conversation may be automatically associated with a tag for that business object.

Once the conversations have been associated with tags, the social branding application may, in some embodiments, group conversations with different tags into a common category (e.g., the "summer volunteer event" and "Friday social" tags may both fall under a broader "work culture" category).

In some embodiments, conversations on a social network site may be organized into "collections" or other types of groupings. For example, a social network user may specify a plurality of conversations as part of a collection, usually related to a particular theme or project. If a particular conversation is identified (through semantic analysis, tags, or other means), then other conversations that share a collection with the identified conversation may also be identified, even if they are not associated with the relevant tags, filters, etc.

In some embodiments, it may also be desired to be able to identify and retrieve conversations participated in by particular users. For example, for a "product manager" position, it may be beneficial to retrieve conversations participated in by users holding the product manager position, even if they are not directly relevant to the position (e.g., conversations pertaining to work culture or other information that a potential job applicant may find relevant). In some embodiments, users of a social network are associated with a profile that tracks the social network activity of the user (e.g., what conversations the user has participated in). By identifying users of interest (e.g., users holding the "product manager" position), the profiles of these users may be accessed in order to retrieve all conversations that they have participated in.

Figure 5:
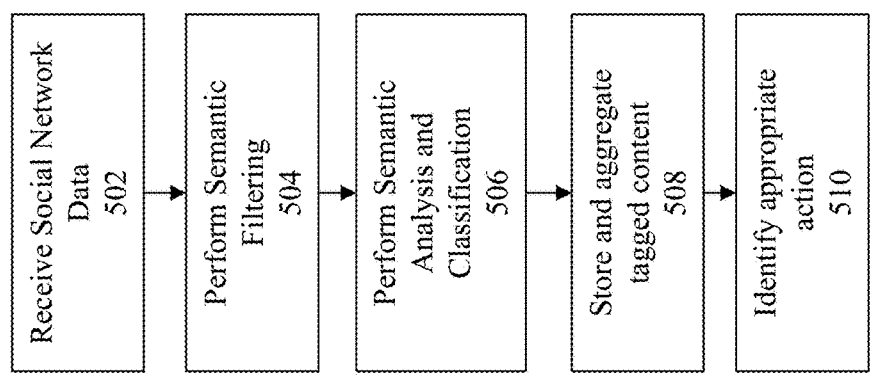
FIG. 5 illustrates a flowchart of a process for identifying and filtering social network data in accordance with some embodiments.

FIG. 5 illustrates a flowchart of a process for identifying and filtering social network data (e.g., social network conversations) in accordance with some embodiments. At 502, social network data is identified or received. The social network data may comprise a plurality of conversations associated with a plurality of different business objects. At 504, semantic filtering is optionally performed on the social data. The filtering may be applied to some or all of the retrieved data. In some embodiments, different levels of filtering may be applied to different types and/or sources of data. For example, different levels of filtering may be applied depending on whether the social data is public social data or private social data.

At 506, semantic analysis and classification is performed on the social network data. In some embodiments, this may comprise applying one or more preconfigured filters or combinations of filters on the social network data, in order to identify and tag potential job seekers from the social network content. For example, a combination of filters may be used to tag social network content as pertaining to "work culture," if the conversations satisfies at least one filter in a group of filters corresponding to different company events (e.g., "Friday social," "summer volunteering event," etc.). In other embodiments, the analysis and classification may comprise a vector-based analysis. Social network conversations may also be, in some embodiments, identified by identifying one or more specified topics or labels associated with the conversation.

At 508, the tagged social network data may be stored in a data store. In addition, in some embodiments, a plurality of statistics may be calculated based upon the stored data, such as number of conversations, number of likes, kudos, or other metrics associated with particular conversations, or users participating in the conversation. In some embodiments, the tagged social network content may be sorted (e.g., by amount of content, kudos or likes associated with the conversation, reputation or talent of the users participating in the conversation, most recently updated conversation, or any other relevant metric), allowing for a user to identify the "best" or most relevant conversations pertaining to a particular business object.

At 510, tagged social network data may be retrieved, and identification is made as to an appropriate action or transformation to take with regards to the retrieved data. In some embodiments, this comprises retrieving individual pieces of tagged social network data. In other embodiments, multiple pieces of social network data associated with a particular tag may be retrieved. In some embodiments, the pieces social network data may be sorted or assigned weights in order to determine which to retrieve or display. For example, social network conversations may be sorted based upon amount of content, relevance of content to the tag, number of posts, reputation of conversation participants, or any other relevant criteria. Once the data has been retrieved, possible actions may include manual actions and/or automatic actions.

If manual actions are to be performed, the social network data and/or candidate profile associated with one or more pieces of social network data may be displayed to a user, and one or more controls provided allowing the user to manually take an action based upon the displayed social network data. For example, excerpts from conversations pertaining to a product manager position may be selected and used by a hiring manager to supplement a job opening posting for a product manager. In some embodiments, combinations of conversation tags may be used to identify conversation content to be used to supplement a job posting or other business-related posting (e.g., conversations about "work culture" participated in by employees who are product managers may be used to supplement a job opening posting for a product manager). Other types of actions may include aggregating content in order to obtain one or more pieces of aggregate data. For example, a plurality of conversations may be analyzed in order to identify commonly used phrases or responses. Profile data from employees who are product managers may be retrieved and aggregated to form an overall profile of a product manager in the organization. The processed data may then be used to perform social branding functions (e.g., supplement a job posting for a product manager position).

In some embodiments, permission to use the content may need to be obtained before the content can be used for social branding purposes. For example, the hiring manager, before being able to use an excerpt of a social network conversation, may be required for privacy reasons to obtain permission from the original poster of the content before being able to post the excerpt as part of a job opening posting. Once the hiring manager has selected a piece of content, an author of the content (e.g., an employee who originally posted the content in a conversation) is identified, and a message requesting permission to use the content is sent to the identified author. Once permission has been received, the content may then be used. In some embodiments, once the hiring manager has selected the desired piece of content, the process of identifying and messaging the author may be performed automatically. In some embodiments, posting the content in response to receiving permission from the author of the content may also be performed automatically.

In some embodiments, a social network conversation may be designated with a privacy access level. For example, when starting a conversation, a user may be given an option to designate the conversation as "public," "private," or as having some other level of access (e.g., limited to a particular workgroup). Typically, if a conversation has been designated as public, then permission may not need to be obtained before using excerpts of the conversation to supplement a job posting or other type of posting.

In addition, some types of content may not require permission to use. For example, aggregate content (e.g., "75% of product managers have worked in the industry for X years, have Y level of education, etc.) and anonymous content (e.g., survey responses) generally do not require permission to be posted.

If an automatic action is to be performed, a rules and workflow engine may be used, comprising a set of rules is provided in a rulebase. The rules identify how content should be handled and directed within the organization. For example, conversations may have different tags corresponding to one or more different job openings, and the action taken may be to forward the conversation or portions of the conversation to a particular department based upon the job opening(s) that the conversation is associated with. In some embodiments, the rulebase may be used to automatically post conversation data, talent data, or other types of data to an open job posting (e.g., automatically post excerpts from the top ten conversations pertaining to the job position, automatically post aggregate talent data, etc.).

Figure 6:
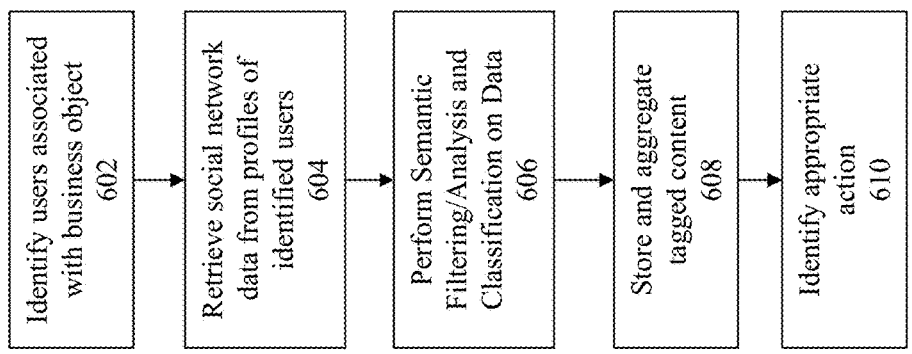
FIG. 6 illustrates a flowchart of a process for identifying and storing social network conversations based upon user in accordance with some embodiments.

FIG. 6 illustrates a flowchart of a process for identifying and storing social network conversations based upon user in accordance with some embodiments. At 602, one or more social network users associated with a business unit are identified. For example, for a "product manager" job opening, users of the social network having the position of product manager are identified. In some embodiments, identifying the users may comprise accessing the profiles of the users in order to retrieve identifying information, such as job position or work group.

At 604, the profiles of the identified users are accessed in order to determine their social network activity. From these profiles, the conversations that the user has participated in may be retrieved.

In some embodiments, at 606, semantic filtering may be optionally performed on retrieved conversations in order to include/exclude certain conversations. For example, some conversations may contain confidential information, which is filtered out such that it is not considered for use on a public job posting. In addition, the conversations may be classified and tagged, based upon semantic analysis (e.g., filters or vector analysis) and/or one or more conversation labels. The content is then stored and aggregated at 608, and actions/ transformations may be performed on the content at 610, similarly to that described above.

Figure 7:
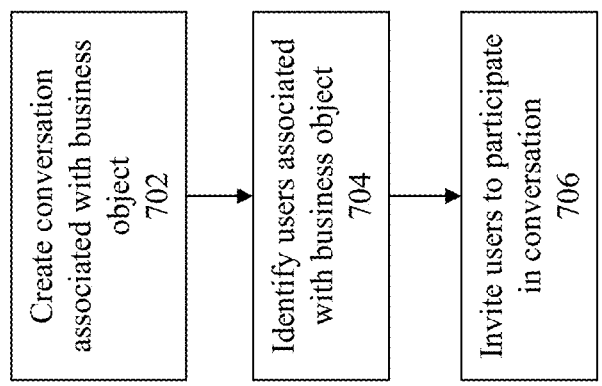
FIG. 7 illustrates a flowchart for a process of creating a conversation in accordance with some embodiments.

In some embodiments, a hiring manager or recruiter may attempt to leverage the employees of the organization to provide additional information for open job postings, by creating a conversation and inviting employees to participate. FIG. 7 illustrates a flowchart for a process of creating a conversation in accordance with some embodiments. At 702, a user, such as an administrator, hiring manager, or recruiter, creates a conversation associated with a business object. For example, a hiring manager may create a social network conversation about a "product manager" job opening. The created conversation may be a general conversation or may pose one or more specific questions for conversation participants to answer. In some embodiments, the conversation may be associated with one or more tags or labels, to allow for easy identification and sorting.

At 704, a plurality of users associated with the business object are identified. For example, for a conversation pertaining to a "product manager" job position, the identified users may include employees who currently hold a product manager position. The identified users may also include other types of employees, such as employees who work for product managers, or are former product managers. Any type of method for identifying the users may be used, such as by retrieving the social network profile of the users, or by querying a employee database. In some embodiments, the creator of the conversation may also manually identify individual users to include in the conversation.

At 706, the identified users are invited to participate in the conversation. The conversation can then be retrieved, analyzed, and transformed as described in FIGS. 5 and 6 above.

Talent Profile Data

Figure 8:
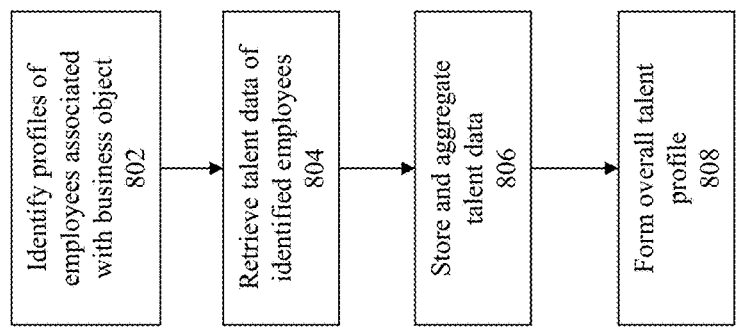
FIG. 8 illustrates a flowchart of a process for processing talent profile data in accordance with some embodiments.

FIG. 8 illustrates a flowchart of a process for processing talent profile data in accordance with some embodiments. The talent profile data may be located in the user profiles in a social network, or in a separate profile management system. At 802, profiles of employees associated with a business object are identified. The business object may correspond to a particular job position (e.g., product manager), a particular workgroup, or other job-related criteria. In some embodiments, the profiles of employees within a business's talent pool data will specify the employee's current job position and work group, and thus can be used to determine which employees should be identified. In some embodiments, the profiles may also specify the employee's former job positions within the business, if any.

At 804, talent information for the identified employees is retrieved. The talent information may include skills, education, certifications, interests, and any other relevant information. In some embodiments, if talent information is retrieved from profiles of employees who held the position in the past are used, it may be necessary to determine the talent profile of the employee at the time that they held the position. In some embodiments, a user may specify particular types or categories of data in include or exclude, while in other embodiments, all talent information may be retrieved.

At 806, the retrieved talent information is stored and aggregated. In some embodiments, the stored talent information is used to form an overall talent profile for the job position at 808. In some embodiments, this comprises identifying one or more talent attributes, such as education level, skills, or years in industry. Once the talent attributes have been identified, the attribute values for the received profiles are aggregated or analyzed to determine an aggregate attribute value. For example, an education level attribute may be analyzed in order to determine an average or a median education level for individuals who have held the job position. In addition or in the alternative, the talent information may be aggregated and sorted to form one or more groupings or lists (e.g., top five skills possessed by product managers, common certifications possessed by product managers, etc.). Portions of the overall talent profile may then be included as part of a job opening posting, so that potential job candidates will be able to gain a better understanding of the qualifications of the job.

Survey/Questionnaire Data

Figure 9:
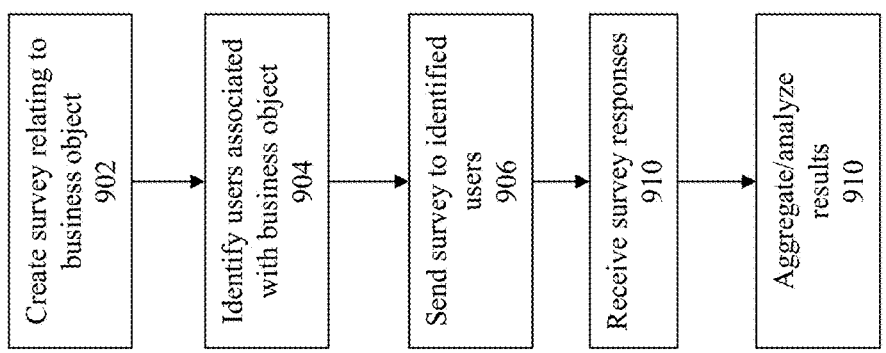
FIG. 9 illustrates a flowchart of a process for processing survey and questionnaire data in accordance with some embodiments.

FIG. 9 illustrates a flowchart of a process for processing survey and questionnaire data in accordance with some embodiments. At 802, a survey or questionnaire is created. The survey may contain one or more questions, and may be associated with one or more business objects. The questions may include multiple-choice questions, written response questions, or any combination thereof.

At 904, one or more users associated with the business object are identified. For example, if a survey pertains to a product manager job position, the users may be employees who hold or have held the product manager job position, employees who have worked for product managers, or any other relevant group. At 906, the survey or questionnaire is delivered to the identified users. At 908, responses from the users are received.

At 910, analysis/transformation is performed on the received results. For example, for responses that are in numerical form (e.g., a rating or score), an aggregate (e.g., average, median, etc.) response may be calculated. In addition, other statistics, such as standard deviation, may be calculated as well. In some embodiments, semantic analysis may be performed on the received survey responses, in order to identify similar answers. For example, once semantic analysis has been performed on the received answers, a most common answer or response to a particular question may be determined.

In some embodiments, the questionnaire/survey data comprises data on which users have answered which surveys. It may be desirable to identify which surveys particular users have answered. For example, with regards to a product manager job posting, it may be desired to identify survey responses by users who are product managers, even if the surveys themselves do not relate to the product manager position (e.g., a product manager answers a survey pertaining to "work culture"). The process for identifying and retrieving survey responses by certain types of users may be similar to that for identifying and retrieving conversations participated in by certain types of users (illustrated in FIG. 6).

Therefore, what has been described is an approach for implementing a system, method, and computer program product for leveraging social network information in order to supplement and enhancing job opening postings and to build a business's social brand.

System Architecture Overview

Figure 11:
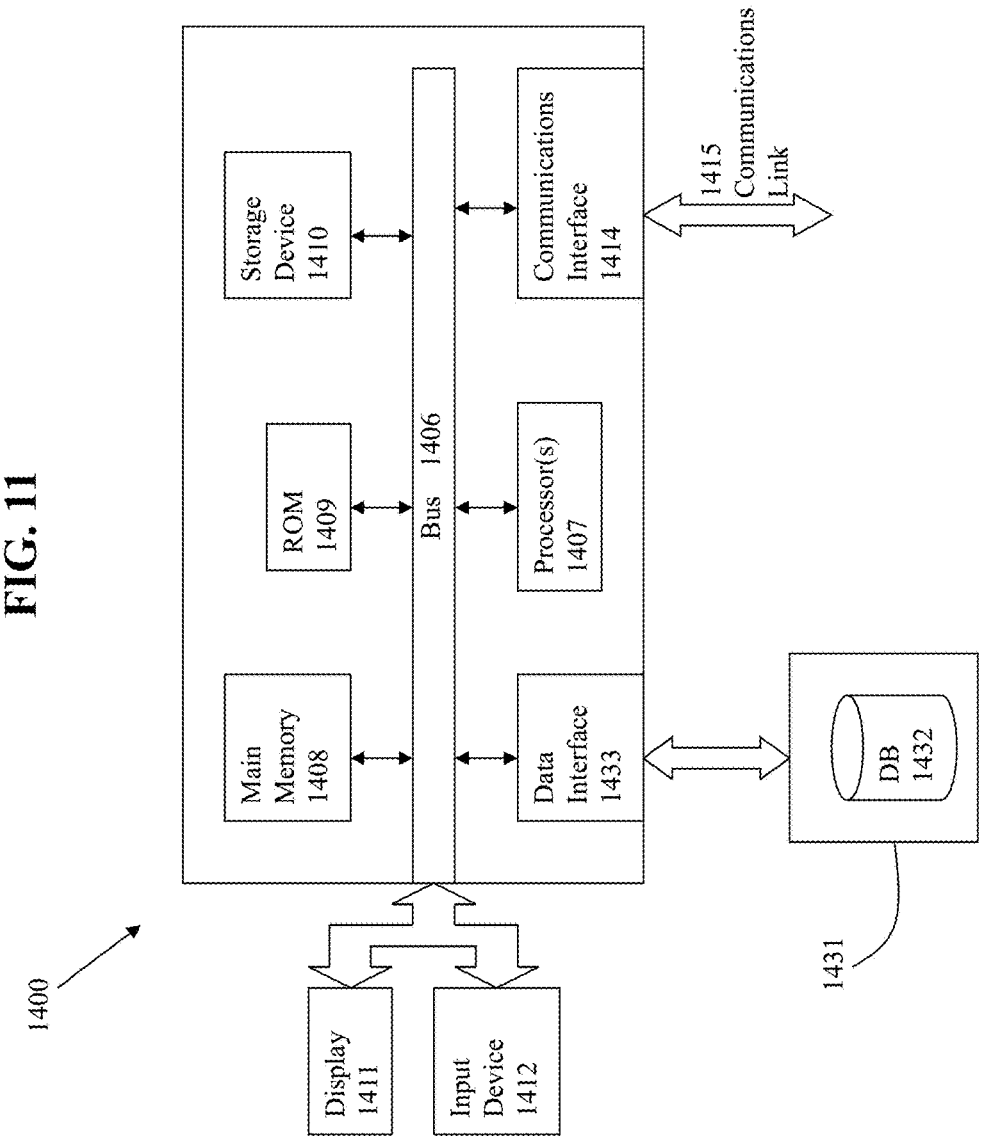
FIG. 11 shows an architecture of an example computing system with which the invention may be implemented.

FIG. 11 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method implemented with a processor for performing social branding for a post object, comprising:

accessing a plurality of data sources stored on a plurality of computing systems, wherein the plurality of data sources include a public social network source and a private social network source, wherein a private social network comprises a social network internal to a specific company and a public social network is not internal to the specific company, wherein permission is required to share social content from the private social network source, with employees in a same workgroup, with employees within a same organization, and with the public;

retrieving content from the plurality of data sources generated by a plurality of users, the content is associated with user demographic information including income, age, profession, geographic location, and importance rating, the importance rating corresponds to weights assigned to the content, and the content with a higher weight is more likely to be displayed then content with a lower weight, the content is selected based at least in part on a comparison of a vector for a post with a vector for the content or a preconfigured tag;

identifying a posting to be supplemented based on at least some of the content from the plurality of data sources, the posting comprising a post object created by the specific company and corresponding to the specific company, the post object corresponds to a job position;

storing the content in a corresponding database storage area comprising a social network conversation data area, an employee talent data area, a workplace reputation data area, and a survey data area, the content is classified, categorized, and tagged prior to performing a transformation on the content, and tags are identified for social media content based on at least a classification;

analyzing the content from the plurality of data sources to identify a subset of the content related to the post object, wherein analyzing the content comprises:
  performing latent semantic analysis, semantic analysis, semantic filtering, and vector analysis on one or more social network conversations,
  applying one or more tags to the one or more social network conversations based at least in part upon a result of the latent semantic analysis, the semantic analysis, the semantic filtering, and the vector analysis, and the semantic filtering is used to remove irrelevant material and confidential information from the content and to reduce occurrences of false positives, false negatives, and inappropriate responses, the semantic filtering is performed on the content from the public social network source but not on the content from the private social network source, wherein content from the public social network source is filtered differently than content from the private social network source,
  clustering of the content based on at least a classification and categorization prior to transformation, and
  processing talent information to generate a talent profile for the post based on employees that held or hold a position corresponding to the posting;

performing a transformation on the subset of the content related to the post object to form transformed content, the transformation comprising:
  selecting one or more excerpts or portions of the content to be used for social branding by identifying an excerpt of a conversation of the one or more social network conversations based at least in part upon one or more tags associated with the conversation where the excerpt of the conversation is used to supplement the posting, and
  aggregating the subset of the content related to the post object to produce one or more pieces of aggregated content, the subset of the content related to the post object comprises the one or more social network conversations, profile information corresponding to one or more users of the plurality of users where the one or more users are associated with the post object; and supplementing the posting with at least some of the transformed content by adding the transformed content to the post object, the transformed content being based at least in part on the subset of the content related to the post object and comprising information corresponding to the posting or an organization that posted the posting.

2. The method of claim 1, wherein the plurality of data sources comprises social network sources.

3. The method of claim 2, wherein the subset of the content related to the post object comprises one or more social network conversations.

4. The method of claim 3, wherein performing a transformation on the subset of the content related to the post object comprises identifying an excerpt of a conversation of the one or more social network conversations, wherein the excerpt of the conversation is used to supplement the posting.

5. The method of claim 3, wherein analyzing the content from the plurality of data sources comprises performing semantic analysis on the one or more social network conversations, and applying one or more tags to the one or more social network conversations based at least in part upon a result of the semantic analysis.

6. The method of claim 3, wherein analyzing the content from the plurality of data sources comprises identifying a conversation of the one or more social network conversations based at least in part upon one or more tags associated with the conversation.

7. The method of claim 3, wherein analyzing the content from the plurality of data sources comprises identifying a user of the plurality of users related to the post object, and wherein the one or more social network conversations comprise conversations participated in by the user.

8. The method of claim 2, wherein the subset of the content related to the post object comprises profile information corresponding to one or more users of the plurality of users, wherein the one or more users are associated with the post object.

9. The method of claim 8, wherein performing a transformation on the subset of the content related to the post object comprises aggregating the subset of the content related to the post object to produce one or more pieces of aggregated content.

10. A non-transitory computer readable medium having stored thereon a sequence of instructions which, when executed by a processor causes the processor to execute a process for performing social branding for a post object comprising:

accessing a plurality of data sources stored on a plurality of computing systems, wherein the plurality of data sources include a public social network source and a private social network source, wherein a private social network comprises a social network internal to a specific company and a public social network is not internal to the specific company, wherein permission is required to share social content from the private social network source, with employees in a same workgroup, with employees within a same organization, and with the public;

retrieving content from the plurality of data sources generated by a plurality of users, the content is associated with user demographic information including income, age, profession, geographic location, and importance rating, the importance rating corresponds to weights assigned to the content, and the content with a higher weight is more likely to be displayed then content with a lower weight, the content is selected based at least in part on a comparison of a vector for a post with a vector for the content or a preconfigured tag;

identifying a posting to be supplemented based on at least some of the content from the plurality of data sources, the posting comprising a post object created by the specific company and corresponding to the specific company, the post object corresponds to a job position;

storing the content in a corresponding database storage area comprising a social network conversation data area, an employee talent data area, a workplace reputation data area, and a survey data area, the content is classified, categorized, and tagged prior to performing a transformation on the content, and tags are identified for social media content based on at least a classification;

analyzing the content from the plurality of data sources to identify a subset of the content related to the post object, wherein analyzing the content comprises:
  performing latent semantic analysis, semantic analysis, semantic filtering, and vector analysis on one or more social network conversations,
  applying one or more tags to the one or more social network conversations based at least in part upon a result of the latent semantic analysis, the semantic analysis, the semantic filtering, and the vector analysis, and the semantic filtering is used to remove irrelevant material and confidential information from the content and to reduce occurrences of false positives, false negatives, and inappropriate responses, the semantic filtering is performed on the content from the public social network source but not on the content from the private social network source, wherein content from the public social network source is filtered differently than content from the private social network source,
  clustering of the content based on at least a classification and categorization prior to transformation, and
  processing talent information to generate a talent profile for the post based on employees that held or hold a position corresponding to the posting;

performing a transformation on the subset of the content related to the post object to form transformed content, the transformation comprising:
  selecting one or more excerpts or portions of the content to be used for social branding by identifying an excerpt of a conversation of the one or more social network conversations based at least in part upon one or more tags associated with the conversation where the excerpt of the conversation is used to supplement the posting, and
  aggregating the subset of the content related to the post object to produce one or more pieces of aggregated content, the subset of the content related to the post object comprises the one or more social network conversations, profile information corresponding to one or more users of the plurality of users where the one or more users are associated with the post object; and supplementing the posting with at least some of the transformed content by adding the transformed content to the post object, the transformed content being based at least in part on the subset of the content related to the post object and comprising information corresponding to the posting or an organization that posted the posting.

11. The computer readable medium of claim 10, wherein the plurality of data sources comprises social network sources.

12. The computer readable medium of claim 11, wherein the subset of the content related to the post object comprises one or more social network conversations.

13. The computer readable medium of claim 12, wherein performing a transformation on the subset of the content related to the post object comprises identifying an excerpt of a conversation of the one or more social network conversations, wherein the excerpt of the conversation is used to supplement the posting.

14. The computer readable medium of claim 12, wherein analyzing the content from the plurality of data sources comprises performing semantic analysis on the one or more social network conversations, and applying one or more tags to the one or more social network conversations based at least in part upon a result of the semantic analysis.

15. The computer readable medium of claim 12, wherein analyzing the content from the plurality of data sources comprises identifying a conversation of the one or more social network conversations based at least in part upon one or more tags associated with the conversation.

16. The computer readable medium of claim 12, wherein analyzing the content from the plurality of data sources comprises identifying a user of the plurality of users related to the post object, and wherein the one or more social network conversations comprise conversations participated in by the user.

17. The computer readable medium of claim 11, wherein the subset of the content related to the post object comprises profile information corresponding to one or more users of the plurality of users, wherein the one or more users are associated with the post object.

18. The computer readable medium of claim 17, wherein performing a transformation on the subset of the content related to the post object comprises aggregating the subset of the content related to the post object to produce one or more pieces of aggregated content.

19. A system, comprising:
a processor;
a memory comprising computer code executed using the processor, in which the computer code implements:
accessing a plurality of data sources stored on a plurality of computing systems, wherein the plurality of data sources include a public social network source and a private social network source, wherein a private social network comprises a social network internal to a specific company and a public social network is not internal to the specific company, wherein permission is required to share social content from the private social network source, with employees in a same workgroup, with employees within a same organization, and with the public;
retrieving content from the plurality of data sources generated by a plurality of users, the content is associated with user demographic information including income, age, profession, geographic location, and importance rating, the importance rating corresponds to weights assigned to the content, and the content with a higher weight is more likely to be displayed then content with a lower weight, the content is selected based at least in part on a comparison of a vector for a post with a vector for the content or a preconfigured tag;
identifying a posting to be supplemented based on at least some of the content from the plurality of data sources, the posting comprising a post object created by the specific company and corresponding to the specific company, the post object corresponds to a job position;
storing the content in a corresponding database storage area comprising a social network conversation data area, an employee talent data area, a workplace reputation data area, and a survey data area, the content is classified, categorized, and tagged prior to performing a transformation on the content, and tags are identified for social media content based on at least a classification;
analyzing the content from the plurality of data sources to identify a subset of the content related to the post object, wherein analyzing the content comprises:
performing latent semantic analysis, semantic analysis, semantic filtering, and vector analysis on one or more social network conversations,
applying one or more tags to the one or more social network conversations based at least in part upon a result of the latent semantic analysis, the semantic analysis, the semantic filtering, and the vector analysis, and the semantic filtering is used to remove irrelevant material and confidential information from the content and to reduce occurrences of false positives, false negatives, and inappropriate responses, the semantic filtering is performed on the content from the public social network source but not on the content from the private social network source, wherein content from the public social network source is filtered differently than content from the private social network source,
clustering of the content based on at least a classification and categorization prior to transformation, and
processing talent information to generate a talent profile for the post based on employees that held or hold a position corresponding to the posting;
performing a transformation on the subset of the content related to the post object to form transformed content, the transformation comprising:
selecting one or more excerpts or portions of the content to be used for social branding by identifying an excerpt of a conversation of the one or more social network conversations based at least in part upon one or more tags associated with the conversation where the excerpt of the conversation is used to supplement the posting, and
aggregating the subset of the content related to the post object to produce one or more pieces of aggregated content, the subset of the content related to the post object comprises the one or more social network conversations, profile information corresponding to one or more users of the plurality of users where the one or more users are associated with the post object; and
supplementing the posting with at least some of the transformed content by adding the transformed content to the post object, the transformed content being based at least in part on the subset of the content related to the post object and comprising information corresponding to the posting or an organization that posted the posting.

20. The system of claim 19, wherein the plurality of data sources comprises social network sources.

21. The system of claim 20, wherein the subset of the content related to the post object comprises one or more social network conversations.

22. The system of claim 21, wherein performing a transformation on the subset of the content related to the post object comprises identifying an excerpt of a conversation of the one or more social network conversations, wherein the excerpt of the conversation is used to supplement the posting.

23. The system of claim 21, wherein analyzing the content from the plurality of data sources comprises performing semantic analysis on the one or more social network conversations, and applying one or more tags to the one or more social network conversations based at least in part upon a result of the semantic analysis.

24. The system of claim 21, wherein analyzing the content from the plurality of data sources comprises identifying a conversation of the one or more social network conversations based at least in part upon one or more tags associated with the conversation.

25. The system of claim 21, wherein analyzing the content from the plurality of data sources comprises identifying a user of the plurality of users related to the post object, and wherein the one or more social network conversations comprise conversations participated in by the user.

26. The system of claim 20, wherein the subset of the content related to the post object comprises profile information corresponding to one or more users of the plurality of users, wherein the one or more users are associated with the post object.

27. The system of claim 26, wherein performing a transformation on the subset of the content related to the post object comprises aggregating the subset of the content related to the post object to produce one or more pieces of aggregated content.

* * * * *

UNITED STATES PATENT AND TRADEMARK OFFICE
CERTIFICATE OF CORRECTION

PATENT NO. : 10,140,591 B2
APPLICATION NO. : 14/498612
DATED : November 27, 2018
INVENTOR(S) : Panigrahi et al.

It is certified that error appears in the above-identified patent and that said Letters Patent is hereby corrected as shown below:

In the Specification

In Column 5, Line 30, delete "that that" and insert -- that --, therefor.

In Column 15, Line 36, delete "PTSN," and insert -- PSTN, --, therefor.

Signed and Sealed this
Seventeenth Day of December, 2019

Andrei Iancu
*Director of the United States Patent and Trademark Office*